United States Patent [19]
Takeda et al.

[11] 3,861,793
[45] Jan. 21, 1975

[54] SOUND-ON SLIDE PROJECTOR

[75] Inventors: Kazutada Takeda; Yukio Kawabata; Mitsuo Nakatani, all of Gifu, Japan

[73] Assignee: Sanyo Electric Co., Ltd., Osaka, Japan

[22] Filed: June 29, 1973

[21] Appl. No.: 375,156

[30] Foreign Application Priority Data
  June 29, 1972  Japan............................. 47-65712
  June 29, 1972  Japan............................. 47-65713
  June 29, 1972  Japan............................. 47-65714
  June 29, 1972  Japan............................. 47-65715
  June 29, 1972  Japan............................. 47-65716

[52] U.S. Cl. .................................. 353/19, 353/120
[51] Int. Cl. ............................................ G03b 31/06
[58] Field of Search ...................... 353/15, 19, 120

[56] References Cited
UNITED STATES PATENTS
3,057,255  10/1962  Bregman ........................... 353/19
3,296,925  1/1967  Yamamoto ........................ 353/19
3,480,356  11/1969  Dimitricopoulos ............... 353/19
3,732,000  5/1973  Annett ............................... 353/19

FOREIGN PATENTS OR APPLICATIONS
978,124  12/1964  Great Britain ..................... 353/19

Primary Examiner—Louis R. Prince
Assistant Examiner—A. J. Mirabito
Attorney, Agent, or Firm—Armstrong, Nikaido & Wegner

[57] ABSTRACT

A sound-on slide projector including a scanning device for magnetically recording or reproducing sound on a slide. The device traces a spiral locus along the magnetically coated frame of the slide film without using any guiding means. The projector also has detecting means for sensing positions of the magnetic head. The detecting means energizes means to reset the magnetic head, which cooperates with magnetic head detaching means disposed between the slide frame and the scanning device. Guard switch means are also included in order to prevent operation of an automatic slide frame changer when the scanning device is operating.

18 Claims, 11 Drawing Figures

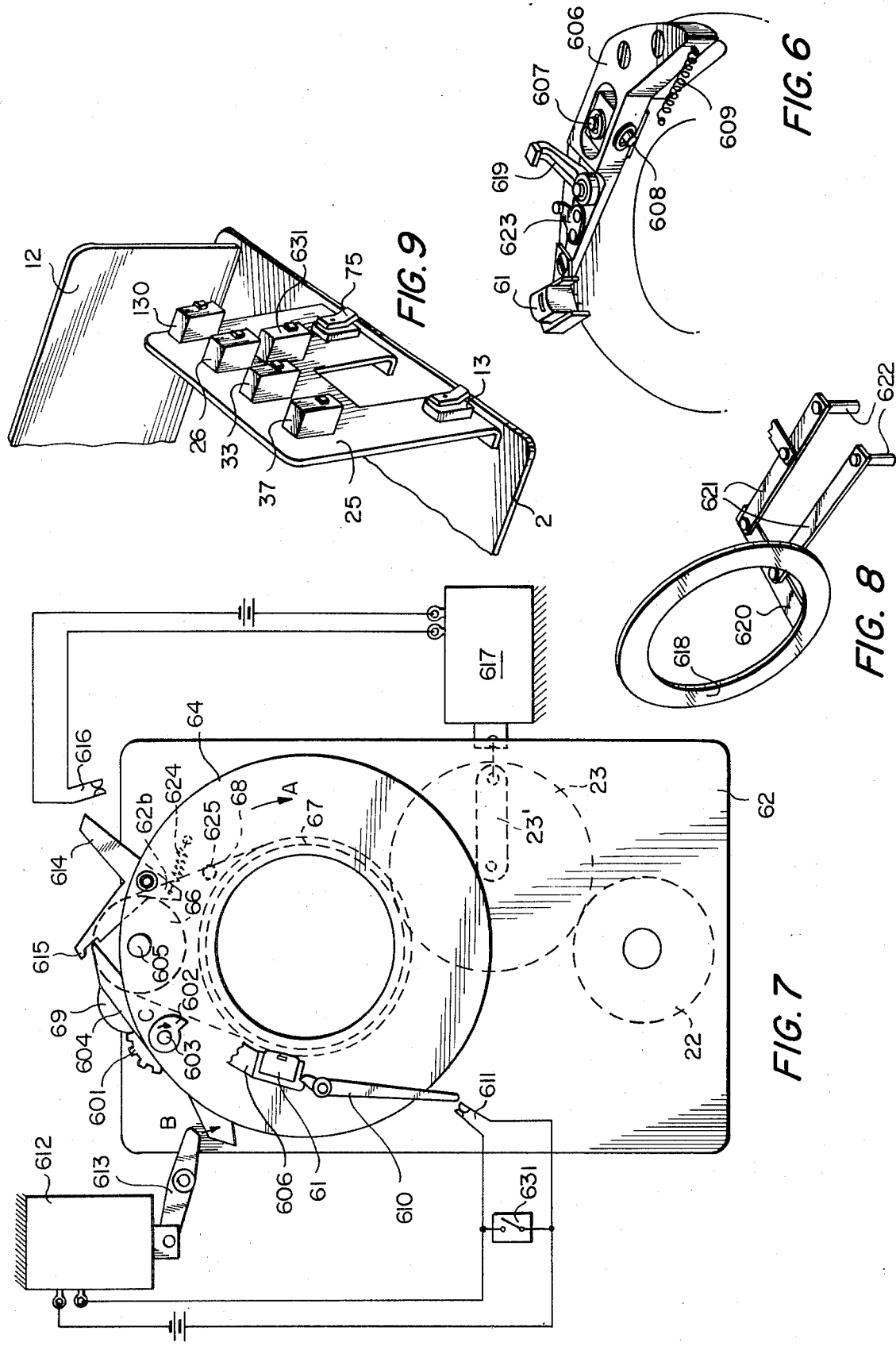

3,861,793

1

SOUND-ON SLIDE PROJECTOR

BACKGROUND OF THE INVENTION

The present invention relates to a sound-on slide projector for a magnetic sound recording and/or reproducing device in which a magnetic head traces along a given planar-spiral curve formed on a magnetically coated frame of the film of a photographic slide projector. The device further includes means for resetting the magnetic head to its original position after the tracing operation. The resetting means cooperates with magnetic head detaching means disposed between the slide frame and the scanning device. During the operation of the scanning device, a guard switch means prevents operation of an automatic slide frame changer.

DESCRIPTION OF THE PRIOR ART

One of the most recent approaches to providing concurrent visual and audio information for slide projectors by disposing a spiral sound groove on the slide frame surrounding the film is described in the U.S. Pat. No. 3,122,054.

In this patent, the scanning device for reproducing the information of the sound track consists of a rotatable disc on which is mounted the usual pick-up cartridge and stylus of a record player. The stylus is spring-biased to follow the guiding groove of the sound track as the disc rotates. If maintained in a vertical plane, this device is subject to the potential dislodgement of the stylus from the track.

SUMMARY OF THE INVENTION

To overcome the disadvantage of the prior art, the present invention proposed a sound-on slide projector comprising:
a scanning device for a magnetic recording or reproducing apparatus which comprises
a support member,
a rotary disc rotably mounted on said support member,
a motor means operatively associated with said rotary disc for imparting rotational movement thereto,
a radially movable magnetic head mounted on said rotary disc,
a motive means operatively associated with said motor means adapted to shift said magnetic head radially along said rotary disc concurrent with the rotation of the latter whereby the locus of movement of said magnetic head is a spiral without any guide member on the planner frame,
detecting means for sensing at least a predetermined radial end position of said magnetic head, and for energizing first operative means upon sensing said end position to disengage said motive means from shifting said magnetic head and to reset said magnetic head back to a predetermined radial starting position,
detaching means for removing said magnetic head and the slide frame during the resetting of the magnetic head,
an automatic slide frame changer including a guide frame, and guard switch means actuated by a starting switch for preventing operation of said automatic slide frame changer when said scanning device is operating.

It is the main object of the present invention to provide a sound-on slide projector which magnetically records or reproduces on a magnetic coated slide frame without any guiding groove and the like.

It is another object of the present invention to provide a sound-on slide projector which has a resetting scanning system.

It is still another object of the present invention to provide a sound-on slide projector which is compatible with a slide frame with magnetic sound truck and a standard slide frame.

It is a further object of the present invention to provide a sound-on slide projector which has guard switch means for preventing operation of an automatic slide frame changer in relation to the scanning device.

BRIEF DESCRIPTION OF THE DRAWINGS

These and other features and advantages of the present invention will become more readily apparent from the following detailed description of the invention when taken in conjunction with the accompanying drawings in which:

FIG. 6 shows an enlarged perspective view of a holding arm on the rotary disc.

FIG. 7 is a front view of the scanning mechanism only for the purpose of explanation of the operation of it.

FIG. 8 shows an enlarged view of a ring which controls the holding arm.

FIG. 9 is perspective view of a panel board on which operation switches are mounted.

DESCRIPTION OF THE PREFERRED EMBODIMENT

Figure 1:
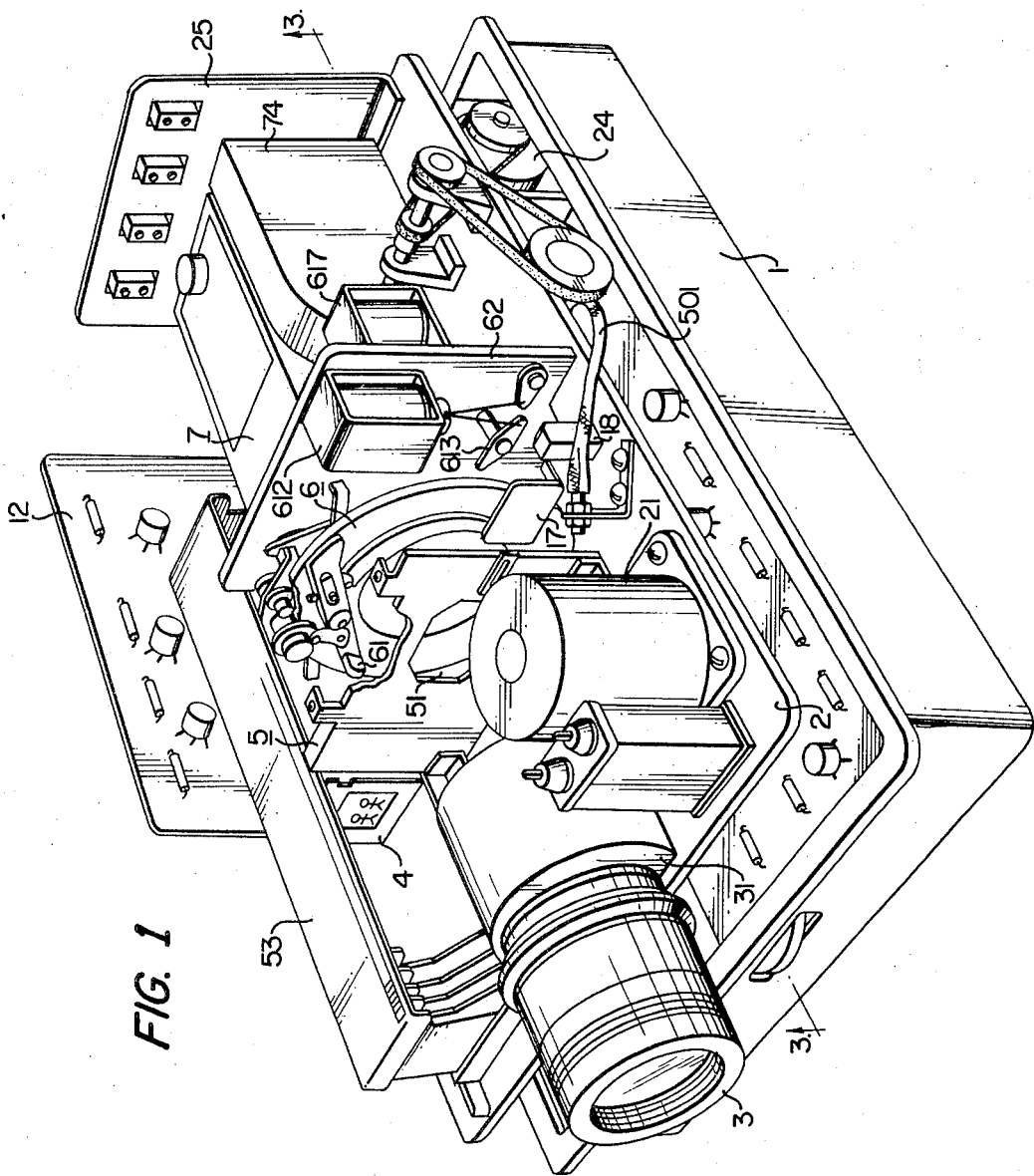
FIG. 1 shows a perspective view of whole mechanism of the present invention partially in section.

FIG. 1 shows a sectional perspective view of the whole mechanical structure of the present invention, in which chassis 2 is held horizontally with a supporting member (not shown) mounted inside of a box type outer covering 1.

A projecting lenses 3, a guide frame 5 for a slide frame 4, a scanning mechanism 6 for a magnetic head 61 which scans along a spiral locus on a magnetic sound track 41 coated on one side of said slide frame 4 surrounding a slidefilm 42 and a lamp case assembly 7 including a halogen lamp used for light source and a reflector and condensing lenses along a projecting light axis are all mounted on chassis 2.

The projection lenses are held on a supporting mount adjustably in focus in accordance with the present invention.

A projection window 51 is positioned in the center of the guide frame 5 coincident with the light axis. A guide groove (FIG. 4) for slide frame 4 is provided at the side of said guide frame facing the scanning mechanism.

A cartridge 53 on the side of the guide frame 5 holds the appropriate members of slide frames 4, which are movable back and forth. Slide frame 4 is loaded in a position facing the projecting window 51 of said guide frame 5 one by one, being guided by said guide groove 52, out of said cartridge 53 by means of an automatic loading mechanism (not shown).

Figure 2A:
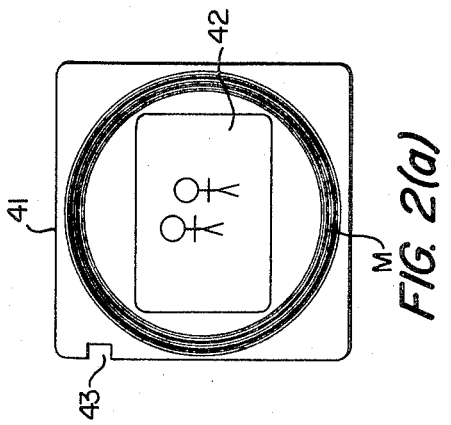
FIG. 2a shows a front view of a sound-on slide frame.
Figure 2B:
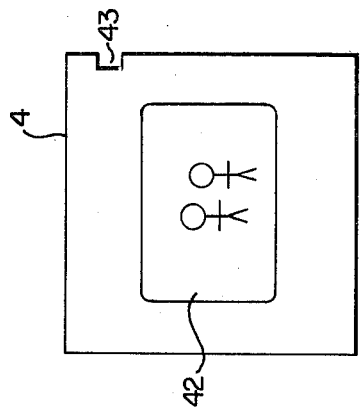

As shown in FIGS., 2a and 2b, magnetic recording medium M is coated or laminated on one side (see FIG. 2(a)) of the slideframe which holds a slidefilm 42 facing the projecting window 51.

At the loading position of the slideframe 4 on the guide frame 5, the magnetic scanning head 61 is driven by the scanning mechanism 6 and scans on the sound track of magnetic recording medium M which faces the scanning mechanism along a spiral locus surrounding the slidefilm 42 in order to record or reproduce information related to the image of the corresponding slidefilm.

Figure 4:
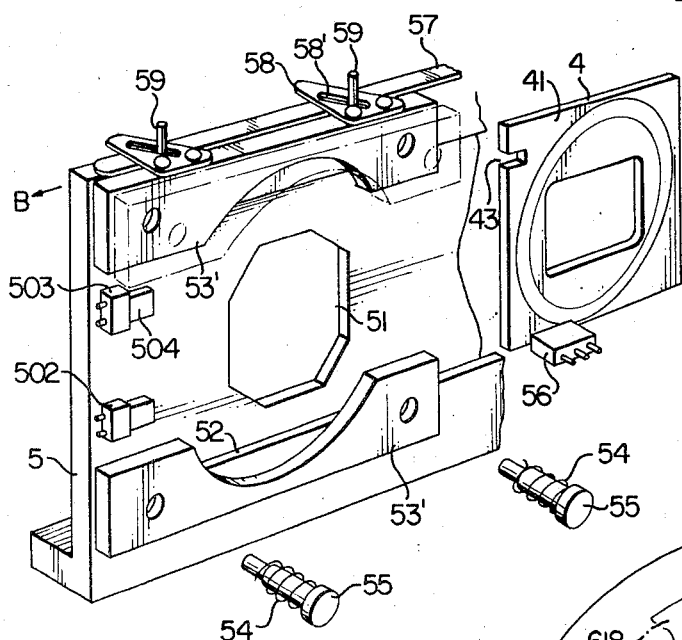
FIG. 4 shows a perspective view of a guide frame.
Figure 5:
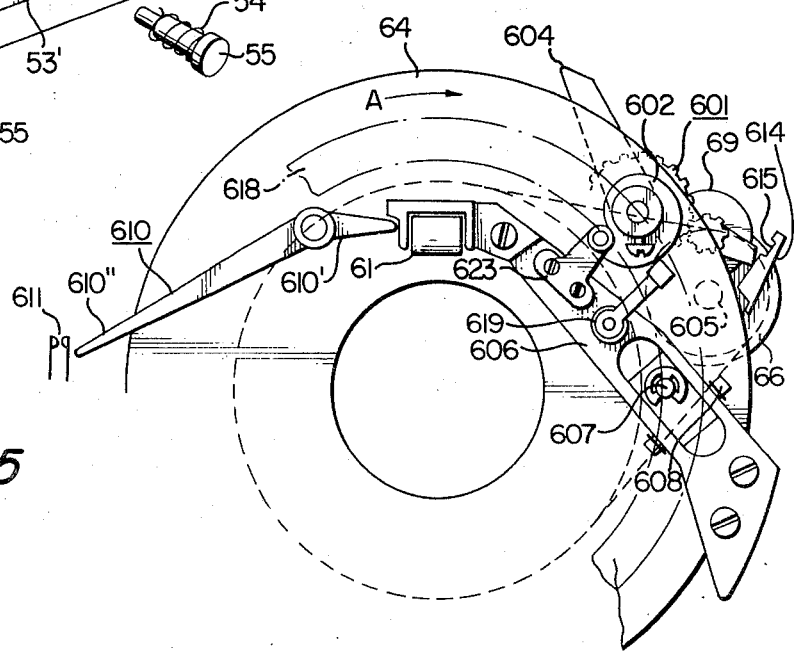
FIG. 5 is a front view of the elementary part of scanning mechanism.

Referring to FIG. 4, a pair of holding plates 53' is mounted on the guide frame 5 facing the guide groove 52. The plates 53' may be mounted on the guide frame 5 with the aid of coil springs 54 around corresponding guide pins 55, so as to form a space between the guide frame 5 and the holding plates 53' in proportion to the thickness of the slideframe 4.

When a thicker slideframe with a soundtrack is inserted in the guide groove 52, a detecting switch 56, which is positioned at the opening edge of the guide groove, operates and actuates a plunger (not shown) for pulling a connecting lever 57, set on both the upper and lower side of the guideframe 5, through a flexible wire 501 in the direction shown as B in FIG. 4. A pair of pins 59 mounted on the connecting lever engage with a pair of slant openings 58 fixed on the holding plate 53, and moves the holding plate toward the position shown in dotted line to facilitate automatic insertion of the thicker slideframe 4.

After the complete loading, the thicker slideframe 4 passes the position of the detecting switch 56, and the holding plate 53 holds the slideframe 4 firmly with the help of said coil springs 54. It should be noted that the same functioning mechanism is also on the lower holding plate 53 but is not shown in the FIG. 4.

Since, at the complete loading position of the slideframe 4 with a sound track on the guide frame 5, it turns on the first switch 502 which is normally open, with its edge to thereby control a recording and reproducing circuit 11, (See FIG. 10), while a second switch 503, which is normally closed, is held closed because of a depression or cutout 43 at the left side of the slide frame 4, the recording and reproducing circuit 11 is turned on.

When a thin standard slideframe with no sound track is inserted, the detecting switch 56 does not operate and accordingly, the holding plate 53 remains as it was, so it is loaded as usual and fixed at the right position with the help of a stopper 504.

At this time, contrary to the case of a thicker slideframe, the standard film which has no depression 43 triggers both switch 502 and 503 with its left side and so the switch 503 is turned off, the circuit 11 remains unactuated.

A scanning mechanism 6 for magnetic head 61 is described in detail hereunder referring to FIG. 3, FIG. 5, FIG. 6 and FIG. 7.

The scanning mechanism 6 which may for example be the same as that shown in U.S. App. S.N. 287,610 assigned to the assignee of the present invention is placed among said guide frame 5 and said lamp case 7 as mentioned before and is assembled on support member 62 which is mounted vertically on said chassis 2

Figure 3:
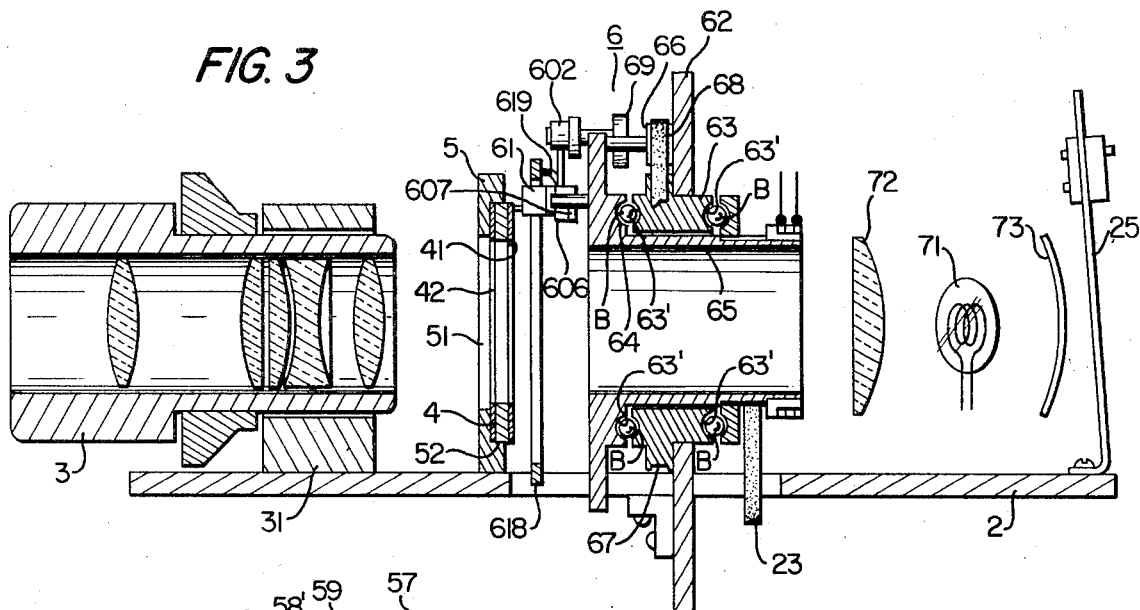
FIG. 3 is a sectional view of the present invention along Section III—III in FIG. 1.

Referring to FIG. 3, the upper center of vertically disposed support member 62 (illustrated as a plate) has a projection window 51 serving as the standard light channel of a slide projector. A pillow ring 63 with bearing portion 63 is fixed on support member 62 in conforming relationship with the window 51 and with the cylindrical part 65 of rotary disc 64. On one side of the rotary disc 64, a planetary pulley 66, is fixed to a rotary axis 605 which is positioned in an aperture in the disc 64.

One side of rotary disc 64 has a hole to rotatably receive a planetary wheel means composed of planetary pulley 66 secured to rotating axis 605. The planetary wheel means assumes a planetary motion by virtue of connecting belt 68 circumferentially engaging planetary pulley 66 and cylindrical portion 67 of the pillow ring 63 (which is fixed to support member 62). When rotary disc 64 rotates, it rotates a cam-plate following a predetermined Archimedian curve by way of an idler 69 and a reduction gear 601, which are mounted on an edge of resetting lever 604 flexibly mounted on an axis 603 of the cam-plate.

The idler 69 is engaged with the planetary pulley and is detachable by means of a coil spring (not shown).

The other edge of the resetting lever 604 protrudes from the edge of the rotary disc. A holding arm 606 is mounted on its axis 607 movable horizontally, is mounted on an axis 608 movable vertically and is biased by a coil spring 609 so as to hold the magnetic head to the starting point of its spiral scanning.

It should be noted that the coil spring 609 functions in two directions, to press the head to outer side of its scanning on the axis 607 and to energize the head on the sound track on the axis 608.

Also affixed to axis 603 is the cam plate 602, having a guiding cam surface following a predetermined Archimedian curve. In co-rotating with idler wheel 69 the cam surface of cam plate 602 engages radially slidable holding arm 606 of magnetic head 61 to move the latter in a radial direction. From the outer position of the magnetic sound track on the slide frame 4 rotation of cam-plate 602 in accordance with the present invention drives magnetic head 61 inwardly toward the center of rotation of rotary disc 64 corresponding with the inner portion of the magnetic sound track.

The starting point for the operation of the scanning device of the present invention is preferably as shown wherein holding arm 606 engages the minimum diameter portion of the cam surface of cam plate 602. At this point, magnetic head 61 is at the farthest possible distance from the center of rotation of rotary disc 64.

To actuate the scanning device, electric motor 21 is energized to rotate rotary disc 64 in a clockwise direction by way of connection pulley belt 68 as determined by the ratio of the diameter of pulley 23 and the cylindrical part 65. The planetary pulley 66 not only rotates with rotary disc 64 but revolves counterclockwise together with rotating axis 605 under the influence of connecting belt 68. The net effect is that planetary pulley 66 and rotating axis 605 assume a planetary-like motion. With idler wheel 69 rotatably engaging rotating axis 605, cam plate 602 is co-rotated in a clockwise manner shifting magnetic head 61 on holding arm 606 inwardly in the radial direction. More precisely, the supporting member 623 following the Archimedian curve of the cam plate 602 is shifted slidably to the center of the rotary disc 64 along its radial direction. The magnetic head 61 rotates with rotary disc 64 and is concurrently shifted via cam plate 602 toward the center of rotary disc 64. The locus of movement of magnetic head 61 is a spiral which, in use, parallels a corresponding traced or to be traced magnetic path on the frame of the film of a photographic slide.

Engaging the front face of magnetic head 61 is a leg 610' of L-shaped lever 610 which is rotably mounted on rotary disc 64. The leg 610' forces holding arm 606 to constantly engage the cam surface of cam plate 602 due to the biasing effect of spring 30 (not shown). A leg 610' of the L-shaped lever 610 is adapted when leg 610' detects the terminal position of magnetic head 61 to close or actuate switch 611 which in turn causes release lever 613 to rotate the resetting lever 604 against the tension of a spring (not shown) by energizing plunger means 612. This counterclockwise rotation (arrow B) of the resetting lever releases idler wheel 69 from engagement with the planetary pulley 66.

In order to return magnetic head 61 outwardly in the radial direction to its original starting position, an elastic means such as coil spring 609 (FIG. 9) is used having one end connected to holding arm 606 and the other end secured to rotary disc 64.

At that time the other wing of the resetting lever 604 is held at the depression 615 of a V-shaped lever 614 which also rotates counterclockwise on its pivot. The other edge of the V-shape lever 614 turns on a switch 616 at the new position described above with the rotation of the rotary disc 64. Plunger 617 is held actuated by a certain self holding means to pull an idler on the arm 23' against a spring (not shown) and releases the idler 23 disengaging with the pulley 22 and the cylindrical part of the rotary disc 64 in order to stop the rotation of the disc 64. When the resetting lever 604 on which the idler gear 601, mounted for rotating the cam plate 602, is held at the depression 615 of said V-shape lever 614, the idler 69 is released from the rotating axis 605. Thus, idler 69 and axis 605 are operably disconnected.

In the FIG. 7, the stopping lever 614 which is holding the resetting lever 604 in its resetting position, is about to turn on the switch 616.

The resetting plunger 612 also actuates a ring or loop 618, placed by the guide frame as shown in FIG. 8. A lever 619 presses against the spring 609 and removes said magnetic head 61 from the tracing position on the magnetic head 61 of the slideframe 4.

With the operation of the resetting plunger 612, the ring 618 is shifted toward the supporting arm 606 along a locus of a link connection formed by a pair of parallel levers 621, mounted on a perpendicularly enlarged portion 620 of the under part of ring 618. The other ends are also mounted rotatably on corresponding axes 622, and the magnetic head 61 is removed from the sound track of magnetic sound track 41 with the holding arm 606 rotating on its axis.

Further, the stopping switch 616 is turned on by the stopping lever 614 and a brake mechanism (not shown) operates to stop the rotary disc at the scanning starting position of the magnetic head 61.

A more accurate stopping position of the head at its scanning starting point will be had by setting the operating position of the switch 616 in relation with the stopping lever 614.

Just after the operation of the brake mechanism a pin member 625 fixed on the support member 62 hits an enlarged portion 626 of the stopping lever 614 and disengages the resetting lever 604 from the depression 615 of the stopping lever.

At the side of the lamp case 7, another case is positioned containing a fan for cooling the lamp which is driven by the second motor 24 (see FIG. 1) which is also the power source of an automatic loading mechanism.

An operation panel 25, on which various functioning switches are disposed, is vertically placed at the rear end of the chassis 2 as shown in FIG. 9.

At one side of the chassis 2 is fixed a circuit board 12 on which the recording and reproducing circuit 11 is assembled.

Operation of the invention may be explained by reference to FIGS. 9 and 10.

When first a main switch 13 on the panel is turned on, electricity is supplied to the recording and reproducing circuit 11 by way of a transformer 14 and a voltage stabilizer 15 as well as to the first motor 21 driving the rotary disc and the second motor 24 which drives the fan for both cooling lamp and automatic loading mechanism of slideframe. Then a switch 75 is switched on to turn on the projector lamp 71.

In the next step, manually or with the movement of the automatic loading mechanism, a loading arm 17 for a slideframe is set at its loading position and then a detecting switch 18 is closed.

When a forward switch 26 on the panel is closed, a relay 27 and a plunger 28 are actuated to drive the autoloading mechanism so that one of the selected slideframes 4 in the slide case 53 shall be loaded in its correct position facing the window of the guide frame 5.

As mentioned above, the detecting switch 56 is closed by the thicker slideframe with sound track to operate the holding plate 53 for easier loading of the slideframe 4 which is thicker than standard slideframes.

The recording and reproducing circuit 11 is kept actuated by the switch 502 closed with the edge of the loaded slideframe which coooperates with the normally closed switch 503. Because of the depression placed at the corresponding edge of the slideframe the circuit 11 remains actuated. An arbitrary slideframe 4 will be loaded one by one in turn by the automatic loading mechanism by pressing the switch 26.

Slideframes will be loaded one by one in the reverse order by the loading mechanism by operating a switch 33 which actuates a reverse relay 34 and a reverse plunger 35.

A switch 36, disposed between both switch 26 and 33 and the switch 502, are closed beforehand as will be explained.

When a playing switch 37 is pressed to energize plunger 38 for releasing the locking mechanism, the idler 23 is shifted to transmit the rotation of the driving pulley to the rotary disc 64.

With the clockwise rotation of rotary disc 64 planetary pulley 66 not only revolves clockwise on the axis of rotary disc 64 but also turns around in counterclockwise fashion on its own axis with the aid of connecting belt 68, which connects the planetary pulley 66 with cylindrical part 65. The planetary pulley further rotates, via idler wheel 69 and cam plate 602 in the direction shown. Holding arm 606 following the Archimedian curve of cam plate 602 is thus shifted slidably to the center of rotary disc 64 in a radial direction.

Since the magnetic head 61 rotates on the axis of rotary disc 64 and also is shifted radially to the center thereof, magnetic head 61 moves in normal operation along a spiral locus in a plane parallel to a sheet coated with a magnetic material. During the shifting movement of magnetic head 61, a coil spring, having a terminal tied to cam plate 602 is wound to store kinetic energy for revolving and resetting cam plate 602 in a counterclockwise direction.

When the head 61 begins to scan along the spiral locus on the recording layer 41 of the slideframe 4 recorded information related to the visual image on the slidefilm which is being projected is reproduced.

Since the guard switch 36 is opened by the plunger 38 as indicated in dotted line, the automatic loading mechanism is locked in spite of the position of both forward switch 26 and reverse switch 33 during the scanning mode of the head 61.

A recording switch 130 on the panel will be operated in order to change to the recording mode by turning a switch 16 to recording position by energizing a relay 140 and a plunger 150.

The resetting plunger 612 will be actuated in both cases when the resetting switch 611 is turned on by the lever 610 at the end of spiral scanning of head when a resetting switch 631 is closed manually at anytime during the recording or playing mode.

As mentioned above in relation with the scanning mechanism, at the end of the spiral scanning of the head the lever 610 closes the resetting switch 611 on the disc 64 with its edge detecting the position of the holding arm 606.

With the rotation of rotary disc 64, the free leg of resetting lever 604 eventually engages release lever 613 to rotate the other leg of resetting lever 604 into depression 618 of V-shaped lever 614 which also rotates counterclockwise on a pivot.

The other edge of the V-shaped lever 614 turns on electrical switch 616 with the rotation of said rotary disc 64 to actuate plunger means 617 which is so maintained by a self-holding means, to pull out idler disc 23 on arm 231 against a spring (not shown). Idler disc 23 is thus disengaged from pulley 22 and the cylindrical part 65 of the rotary disc 64 to stop the rotation of rotary disc 64.

When the resetting lever 604, on which idler wheel 69 is mounted for the rotating cam plate 602, is held at the depression 615 of the V-shaped lever 35, the idler wheel 69 is released from rotating engagement with rotating axis 605. In this situation, idler gear 601 as well as cam plate 602 are free for rotation on their axis and, accordingly, revolve in the counterclockwise direction by means of the potential kinetic energy stored in a coil spring (not shown). So the magnetic head 61 is reset to the starting position automatically by means of the spring 609.

Figure 10:
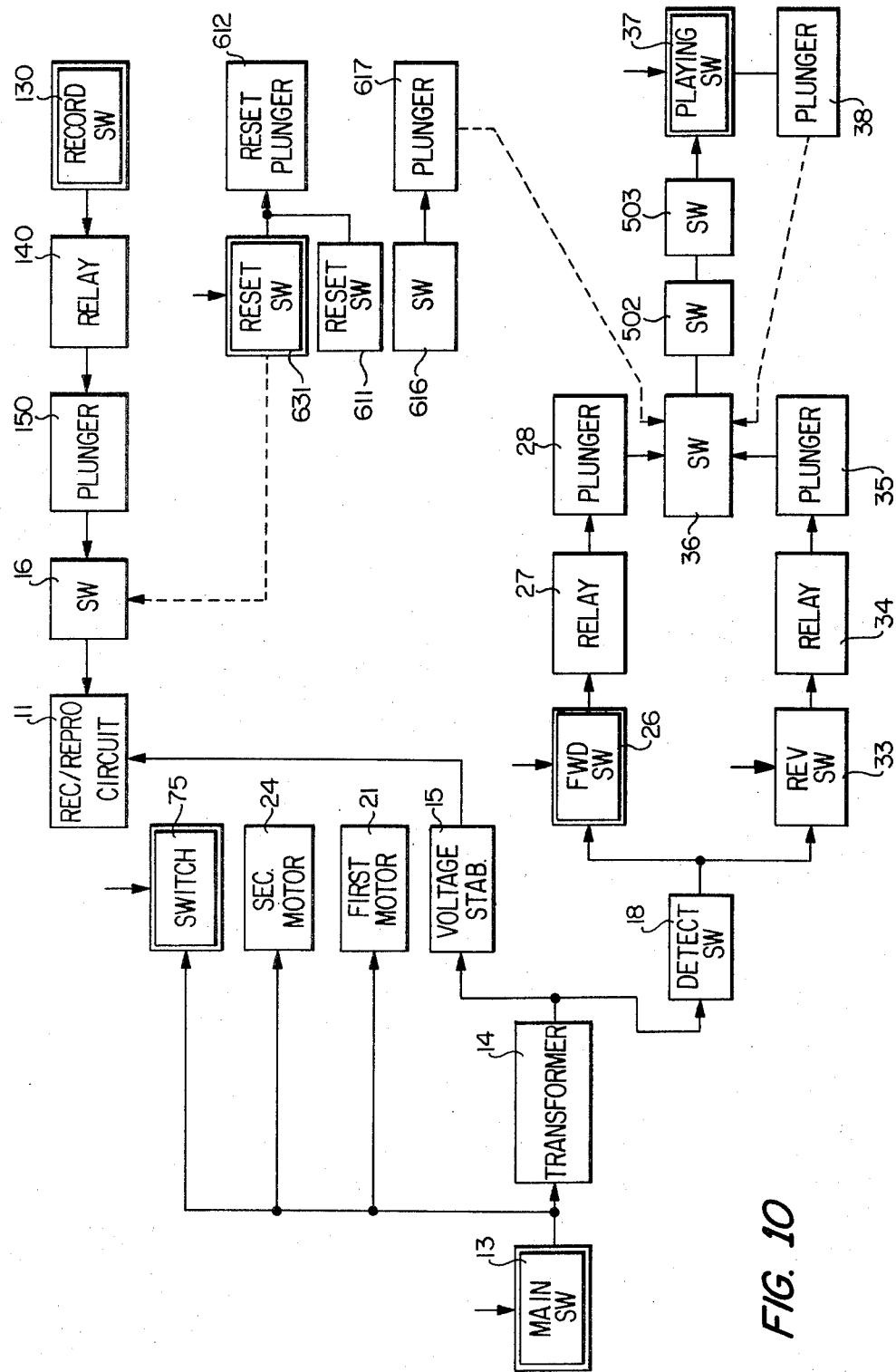
FIG. 10 shows a block diagram explaining the operation order of the switches.

Further the switch 36 is closed, as shown in FIG. 10 with the dotted line, by the plunger 617 and enable to operate the forward switch 26 or reverse switch 33 for exchanging the slideframe.

When circuit 11 has been kept in the recording mode by means of the record switch 130, and when the resetting switch 611 or intersecting resetting switch 631 is operated, the recording and reproducing switch 16 will eventually be turned to the reproducing position.

While several embodiments of the invention have been shown and described, other variations will be readily apparent to those skilled in the art. Therefore, the invention is not limited to these embodiments but is intended to cover all such variations as may be within the scope of the invention defined by the following claims:

What is claimed is:

1. A sound-on slide projector comprising:
   a. a scanning means for a magnetic recording or reproducing apparatus, said scanning means including
      a support member,
      a rotary disc rotably mounted on said support member,
      motor means operatively associated with said rotary
      disc for imparting rotational movement thereto,
      a radially movable magnetic head mounted on said rotary disc, motive means operatively connected to said motor means for shifting said magnetic head radially along said rotary disc concurrent with the rotation of said disc whereby the locus of movement of said magnetic head defines a spiral recording or reproducing track and resetting means for resetting said magnetic head back to a predetermined radial starting position;
   b. a detecting means for sensing at least a predetermined radial end position of said magnetic head and for energizing first operative means upon sensing said end position to disable said motive means and to activate said resetting means;
   c. means for detaching said magnetic head and the slide frame during the resetting of said magnetic head;
   d. slide frame changer means for positioning a slide in a projector guide frame means; and,
   e. a guard switch means actuated by a starting switch for preventing operation of said automatic slide frame changer when said scanning means is operating.

2. A sound-on slide projector as claimed in claim 1, wherein said motive means includes a rotatable cam means having a cam surface for shifting said magnetic head, said cam means being operatively associated with planetary wheel means rotatably mounted on said rotary disc for transmitting rotational movement imparted by said motor means to rotate said cam means.

3. A sound-on-slide projector as claimed in claim 2, wherein said motive means further includes an engaging means fixedly attached to said support member and having a circular surface with a center coinciding with the center of rotation of said rotary disc, said circular surface operatively engaging said planetary wheel means so that the rotation of said rotary disc by said motor means effects the rotation of said planetary wheel means.

4. A sound-on-slide projector as claimed in claim 3, wherein said engaging means is a ring-shaped member, the outer circumference of which is disposed closer to the center of rotation of said rotary disc than the furthest point of said planetary wheel means and said planetary wheel means includes a planetary pulley wherein said ringshaped member and said planetary pulley are circumferentially connected by a belt.

5. A sound-on slide projector as claimed in claim 1, wherein said detaching means includes a loop-shape member, a portion of which engages a magnetic head supporting means with the movement in the direction of the axis of said loop.

6. A sound-on slide projector as claimed in claim 5 wherein said loop-shape member includes an extending portion, perpendicular to the loop plane, connected with a link mechanism which shifts the loop member, and then the magnetic head in the direction of the axis of the loop.

7. A sound-on slide projector as claimed in claim 1, wherein said guide frame includes a movable frame holder.

8. A sound-on slide projector as claimed in claim 7, wherein said movable frame holder is responsive to a frame detector means, disposed at the inlet portion of said guide frame, for detecting the width of said slide frame.

9. A sound-on slide projector as claimed in claim 1,, wherein said guide frame has at least two complimentary switches, for sensing a cutout portion in a slide frame, said switches turning on a recording and/or reproducing circuit only in response to an inserted slide frame with a cutout portion on a side edge thereof.

10. A sound-on slide projector as claimed in claim 1, wherein said guard switch means is reset by a stopping switch to enable said automatic changer means to operate.

11. A sound-on slide projector comprising:
a. a scanning means for a magnetic recording or reproducing apparatus which comprises
 a support member,
 a rotary disc rotably mounted on said support member,
 a motor means operatively associated with said rotary disc for imparting rotational movement thereto,
 a radially movable magnetic head mounted on said rotary disc, and
 motive means for shifting said magnetic head radially along said rotary disc concurrent with the rotation of said rotary disc whereby the locus of movement of said magnetic head is a spiral, said motive means including a rotatable cam means having a cam surface for shifting said magnetic head, said cam means operably associated with a planetary pulley rotatably mounted on said rotary disc and a ring-shaped member, engaging said planetary pulley wherein outer the circumference of said ring shaped member is disposed closer to the center of rotation of said rotary disc than is the furthest point of said planetary pulley;
b. detecting means for sensing at least a predetermined radial end portion of said magnetic head including a detecting lever, pivoted on said rotary disc, wherein one leg of said lever is engaged with a support means for said magnetic head and drives said magnetic head in the direction toward said cam means and a switch, closed by the other leg of said detecting lever when the end of the scanning of said head is detected, whereby the first plunger means are actuated,
c. detaching means for removing said magnetic head and the slide frame during resetting of said magnetic head,
d. slide frame changer means including guide frame means, and
e. guard switch means actuated by a starting switch for preventing operation of said automatic slide frame changer means when said scanning means is operating.

12. A sound-on slide projector as claimed in claim 11, wherein said detaching means includes a loop-shape member, a portion of which engages a magnetic head supporting means with the movement in the direction of the axis of said loop.

13. A sound-on slide projector as claimed in claim 11, wherein said guide frame includes a movable frame holder.

14. A sound-on slide projector as claimed in claim 13, wherein said movable frame holder is responsive to a frame detector means disposed at the inlet portion of said guide frame for detecting the width of said slide frame.

15. A sound-on slide projector as claimed in claim 11, wherein said guide frame has at least two complimentary switches for sensing a cutout portion in a slide frame, said switches turning on a recording and/or reproducing circuit only in response to an inserted slide frame with a cutout portion of a side edge thereof.

16. A sound-on slide projector as claimed in claim 11, wherein said guard switch means is reset by a stopping switch to enable said automatic changer means to operate.

17. A sound-on slide projector comprising:
a. a scanning means for a magnetic recording or reproducing apparatus which comprises a support member, a rotary disc rotably mounted on said support member, a motor means operatively associated with said rotary disc for imparting rotational movement thereto, a radially movable magnetic head mounted on said rotary disc, a motive means for shifting said magnetic head radially along said rotary disc concurrent with the rotation of said rotary disc whereby the locus of movement of said magnetic head is a spiral, said motive means including a rotatable cam member having a cam surface shifting said magnetic head, said cam member operably associated with a planetary pulley rotatably mounted on said rotary disc engaged with a ring-shaped member, the outer circumference of said ring-shaped member disposed closer to the center of rotation of said rotary disc than is the furthest point of said planetary pulley
b. detecting means for sensing at least a predetermined radial end position of said magnetic head including a detecting lever pivoted on said rotary disc, one leg of said lever engaging said magnetic head to force it against said cam member and a switch closed by the other leg of said detecting lever when the scanning end of said head is detected, said switch actuating said first operative means,
c. detaching means for removing said magnetic head and the slide frame during the resetting of said magnetic head said detaching means including a loop-shaped member having an extending portion perpendicular to said loop plane and a link mechanism which first shifts the loop member, and then the magnetic head, in the direction of the axis of the loop member
d. an automatic slide changer means including a guide frame having a movable slide holder responsive to a frame detector disposed at the inlet portion of the guide frame for detecting the width of the slide frame said guide frame including at least two complementary switches for sensing a cutout portion in a slide frame, said switches turning on a recording and/or reproducing circuit only in response to an inserted slide frame having a cutout portion on a side edge thereof, and e. guard switch means actuated by a starting switch for preventing operation of said automatic slide frame changer means when said scanning means is operating said guard switch means being reset by a stopping switch in order to enable the operation of said automatic changer means.

18. A sound-on slide projector comprising:

a. a scanning means for a magnetic recording or reproducing apparatus said scanning means including:

a support member, a rotary disc rotably mounted on said support member, a motor means operatively associated with said rotary disc for imparting rotational movement thereto, a radially movable magnetic head means comprising magnetic head and a support means therefor mounted on said rotary disc, and, planetary motive guide means mounted on said rotary disc including a cam means and coil spring said guide means shifting said magnetic head radially along said disc whereby the locus of movement of said magnetic head defines the spiral sound track on the plane magnetic coated surface surrounding the slide film;

b. detecting means for sensing at least a predetermined radial end portion of said magnetic head, said detecting means including a detecting lever having two legs pivotally mounted on said rotary disc, wherein one leg of said lever is engaged by said support means and the other leg of said detecting lever operates a switch when the end of the scanning of said head is detected, whereby a first plunger means is actuated for causing said magnetic head to be reset to its initial position;

c. means for removing said magnetic head and the slide frame during resetting of said magnetic head; and, d. slide frame changer means including guide frame means for positioning a slide within said projector.

* * * * *